United States Patent [19]

Spease

[11] Patent Number: 4,763,541

[45] Date of Patent: Aug. 16, 1988

[54] REMOTE CONTROL ASSEMBLY INCLUDING SIDE SNAP IN

[75] Inventor: Arthur L. Spease, Livonia, Mich.

[73] Assignee: Teleflex Incorporated, Limerick, Pa.

[21] Appl. No.: 895,155

[22] Filed: Aug. 11, 1986

Related U.S. Application Data

[63] Continuation-in-part of Ser. No. 796,408, Nov. 8, 1985, abandoned.

[51] Int. Cl.⁴ .............................................. F16C 1/10
[52] U.S. Cl. .................................. 74/501 R; 248/56
[58] Field of Search ............. 74/502.4, 501 F, 501 R, 74/502, 501.5; 248/56, 27.3, 27.1, 21.3, 222.1, 231.9; 403/316, 197, 194, 201, 331; 16/2; 174/153 G; 411/104, 107, 103, 108, 111, 112, 131, 175, 182, 549, 907; 285/162, 325, 158, 137.1

[56] References Cited

U.S. PATENT DOCUMENTS

| | | | |
|---|---|---|---|
| 1,821,294 | 9/1931 | Dieter | 248/56 |
| 2,474,172 | 6/1949 | Tinnerman | 248/56 X |
| 2,494,814 | 1/1950 | Hath | 248/56 X |
| 2,912,878 | 11/1959 | Brickman | 74/501 D X |
| 3,229,026 | 1/1966 | Sulzer | 16/2 X |
| 3,366,356 | 1/1968 | Fisher | 16/2 X |
| 3,505,900 | 4/1970 | Stahr | 74/501 D |
| 3,542,980 | 11/1970 | Hamilton | 403/197 X |
| 3,634,608 | 1/1972 | Buhl | 248/56 X |
| 3,853,414 | 12/1974 | Hirano et al. | 403/71 |
| 3,885,767 | 5/1975 | Olowinski et al. | 248/56 X |
| 3,955,441 | 5/1976 | Johnson | 74/502.4 |
| 4,053,701 | 10/1977 | Ogilvie et al. | 16/2 X |
| 4,157,799 | 6/1979 | Simon | 285/162 X |
| 4,339,213 | 7/1982 | Gilmore | 74/501 D X |
| 4,340,199 | 7/1982 | Brock | 248/221.3 |
| 4,474,489 | 10/1984 | Simon | 248/56 X |
| 4,519,723 | 5/1985 | Kusmierz | 403/316 X |

FOREIGN PATENT DOCUMENTS

| | | | |
|---|---|---|---|
| 2261933 | 7/1974 | Fed. Rep. of Germany | 285/325 |
| 2315032 | 1/1977 | France | 411/112 |
| 1230504 | 5/1971 | United Kingdom | 403/194 |

*Primary Examiner*—Gary L. Smith
*Assistant Examiner*—Rodney M. Lindsey
*Attorney, Agent, or Firm*—Reising, Ethington, Barnard, Perry & Milton

[57] ABSTRACT

A motion transmitting remote control assembly (10) of the type for transmitting forces along a curved path by a motion transmitting core element (30) including a support fitting (24) having first and second ends and an opening (14) extending therethrough defining a first axis for guiding a core element (30) through a substantially U-shaped seat (16) in a support structure (18). A core element (30) is movably supported by the support fitting (24) for transmitting motion between the ends thereof. The assembly is characterized by including a projection finger (38) spaced laterally from the first axis defined by the opening (14) for gripping engagement with the support structure (18) and preventing the end support fitting (24) from moving laterally out of the U-shaped seat (16). Axial deflection of the finger (38) is limited by a stop member (47).

17 Claims, 4 Drawing Sheets

# REMOTE CONTROL ASSEMBLY INCLUDING SIDE SNAP IN

RELATED APPLICATION

This application is a continuation-in-part of copending application Ser. No. 796,408 filed Nov. 8, 1985, now abandoned.

TECHNICAL FIELD

The subject invention relates to a motion transmitting remote control assembly of the type for transmitting forces along a curved path by a flexible motion transmitting core element removably supported within a guide means, such as a conduit. More specifically, the instant invention relates to a guide means including an end fitting and conduit wherein the end fitting is retained within an opening in a support wall or bracket.

BACKGROUND ART

Prior motion transmitting remote control assemblies have included guide means including a conduit supported within a support fitting. Often, a support fitting is required for disposition of the guide means in a wall of the like which may have any one of various thicknesses. For example, the U.S. Pat. No. 3,427,894 to Tschanz, issued Feb. 18, 1969, includes includes a remote control assembly including a conduit, a motion transmitting core element movably disposed in the conduit, and a support fitting for disposition in a noncircular aperture in a wall or the like. Such support fittings are constructed for supporting the assembly through an aperture. The assembly includes a pair of flexible legs extending generally toward a flange in a cantilivered fashion from the body of the assembly at a location spaced from the flange for moving through the aperture as the fitting is inserted therein to engage the wall at the other extremity of the aperture for retaining the fitting therein. The U.S. Pat. Nos. 4,304,149 to Heiman, issued Dec. 7, 1981 and 3,631,738 to Harper, issued Jan. 4, 1972 are other examples of support fittings including cantilivered legs for retaining a support fitting in an aperture.

In other environments, a motion transmitting core element is supported along the length of a wall by support means which snaps into mechanical interlocking engagement with a wall having an aperture therein. An example of such support fitting is disclosed in the U.S. Pat. No. 4,011,770 to Webb, issued Mar. 15, 1977.

Present applications of motion transmitting remote control assemblies require that the guide means guide a core element through a substantially U-shaped seat in a support structure. Unlike structural situations where a support fitting is supported through an aperture and wherein the support fitting must be fixed against axial movement through the aperture, an environment wherein the guide means seated in a U-shaped seat in a support structure presents problems of the guide means sliding laterally out of the U-shaped seat. The instant invention provides means for preventing the guide means from moving laterally out of the Ushaped seat. The U.S. Pat. No. 3,885,767 to Olowinshi et al issued May 27, 1975 discloses a snap in mounting assembly for preventing a mounting from moving out of a U-shaped seat. The assembly requires at least two projections to maintain the mounting in the seat. Also, the locking of the mounting takes place only when the lock ring is in a deflected position.

STATEMENT OF THE INVENTION AND ADVANTAGES

According to the present invention there is provided a motion transmitting remote control assembly of the type for transmitting forces along a curved path by a motion transmitting core element including guide means having first and second ends and an opening therethrough defining a first axis for extending through a substantially U-shaped seat in a support structure and a core element movably supported by the guide means for transmitting motion between the ends of the guide means. The assembly includes abutment means for positioning the guide means in the substantially U-shaped seat on the support structure. An arm extends laterally from the guide means and the abutment means. A gripping means is disposed on the arm for gripping engagement with the support structure and preventing the guide means from moving laterally out of the U-shaped seat. The arm is flexible. The gripping means has a neutral condition and a deflected condition. The arm biases the gripping means toward the neutral condition from the deflected condition. The arm is substantially L-shaped and has a distal end relative to the guide means. The gripping means is disposed on the distal end.

Accordingly, the present invention offers the advantages of using only one gripping means to prevent the assembly from moving out of the U-shaped seat.

FIGURES IN THE DRAWING

Other advantages of the present invention will be readily appreciated as the same becomes better understood to the following detailed description when considered in connection with the accompanying drawings wherein.

DETAILED DESCRIPTION OF THE DRAWINGS

Figure 1:
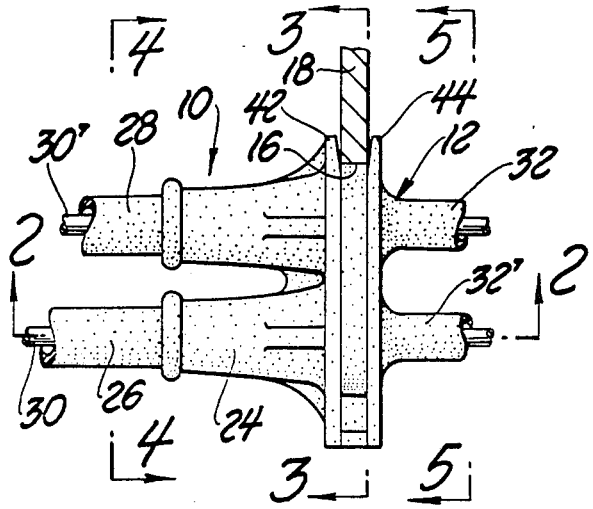
FIG. 1 is a fragmentary side view of a preferred embodiment of the instant invention mounted on a support structure shown in cross-section; section.
Figure 2:
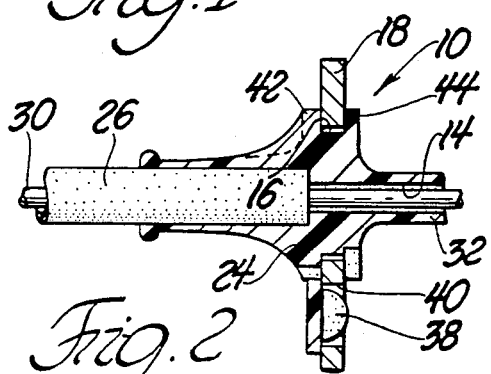
FIG. 2 is a cross-sectional view taken substantially along lines 2—2 of FIG. 1.

A motion transmitting remote control assembly of the type for transmitting motion in a curved path is generally shown at 10 in the Figures. Like numerals are used to indicate similar structure between the different embodiments.

The assembly 10 includes guide means generally indicated at 12 including a support fitting 24 having first and second ends and an opening 14 extending therethrough and defining an axis for guiding a core element through a substantially U-shaped seat 16 in a support structure 18. The U-shaped seat 16 has an opening 20 in the top surface 22 of the support structure 18.

The guide means 12 includes a support fitting 24 and a conduit 26 having one end mounted in the opening 14 of the support fitting 24. Alternatively, as shown in FIGS. 1 through 5, the support fitting 24 may include a second opening 14' extending therethrough and defining a second axis spaced from the parallel relative to the first axis defined by the first opening 14. The guide means 12 includes a second conduit 28 having the end portion mounted with the second opening 14'. In this manner, the support fitting 24 shown in FIGS. 1 through 5 may carry two cables for an accelerator and for a cruise control or alteratively, the assembly is shown in FIGS. 6 through 13 may be used for accelerator cable.

The assembly 10 includes a core element 30 movably supported by the guide means 12 for transmitting motion between the ends of the guide means 12. As shown in FIGS. 1 through 5, the assembly 10 may include a second cable 30' carried in the second conduit 28.

The guide means 12 may include a tubular end portion 32, 32' as shown in FIGS. 1 through 5. Alternatively, the guide means 12 may include a male spherical end portion 34 and a wiper member 37 snapped onto the male spherical end portion 34 as shown in FIGS. 6 through 13. The end fitting shown in FIGS. 6 through 13 is described in detail in U.S. Pat. No. 4,173,157 to Miller et al, issued Nov. 6, 1979. The guide means may be constructed in another manner of form then is described above depending upon the specific environment in which the guide means is used and the purposes for which it is being used.

The assembly 10 includes abutment means for positioning the guide means 12 in the substantially U-shaped seat 16 on the support structure 18. The assembly further includes gripping means spaced laterally from the first axis defined by the opening 14 for gripping engagement with the support structure 18 and for preventing the guide means 12 from moving laterally out of the U-shaped seat 16. More specifically, the assembly includes an arm 36 extending laterally from the guide means 12 and the abutment means. The gripping means is disposed on the arm 36. The gripping means includes a finger like projection 38 projecting along a second axis which is substantially parallel to and spaced from the first axis defined by the opening 14. The finger like projection or detent 38 is engaged within a hole 40 in the support structure 18. Upon insertion of the support fitting 24 into the substantially U-shaped seat 16, the support fitting 24 is inserted sufficiently so that the finger like projection 38 is engaged within the Ushaped seat 16 and preventing the support fitting 24 from sliding out of the U-shaped seat 16.

The arm 36 is flexible. The gripping means has a neutral condition and a deflected condition, the arm 36 biasing the gripping means towards the neutral condition from the deflected condition. Upon insertion of the support fitting 24 into the U-shaped seat 16, the finger like projection 38 will engage the support structure 18 thereby being moved to the deflected condition. Upon sufficient insertion of the support fitting 24 into the U-shaped seat 16, the finger like projection 38 engages the hole 40 in the support structure 18 and the arm 36 biases the finger like projection 38 to the neutral condition wherein the finger like projection 38 is disposed within the hole 40. In other words, the arm 36 biases the finger like projection into the hole 40 and the support structure 18 thereby maintaining the end fitting 24 locked in the U-shaped seat 16 with the arm 36 in a nondeflected or neutral position. As shown in FIGS. 4, 5, 8, 9, 12, and 13, the arm 36 is substantially L-shaped. The arm 36 has a distal end relative to the support fitting 24. The finger like projection 38 defining the gripping means is disposed on that distal end of the arm member 36. In this manner, the projection 38 engages the hole 40 of the support structure 18 at a point spaced from the substantially U-shaped seat 16.

Figure 7:
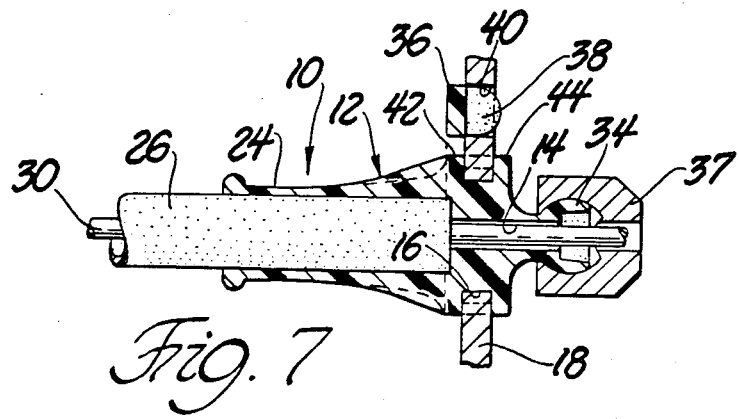
FIG. 7 is a cross-sectional view taken substantially along lines 7—7 of FIG. 6.
Figure 8:
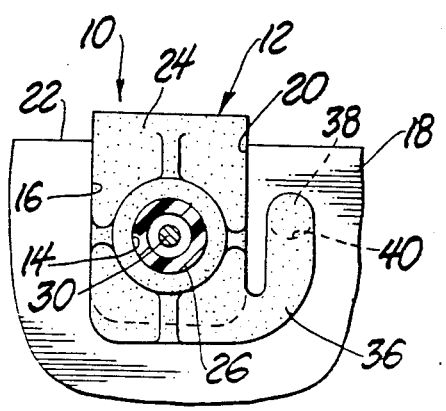
FIG. 8 is a cross-sectional view taken substantially along lines 8—8 of FIG. 6.
Figure 9:
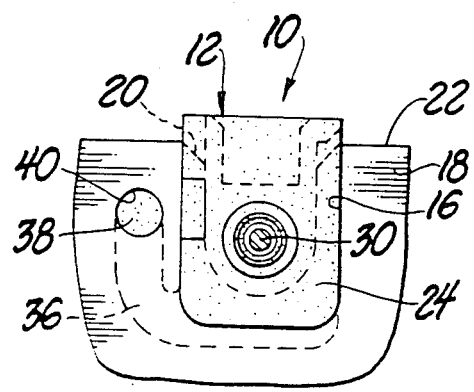
FIG. 9 is a cross-sectional view taken substantially along lines 9—9 of FIG. 6.
Figure 10:
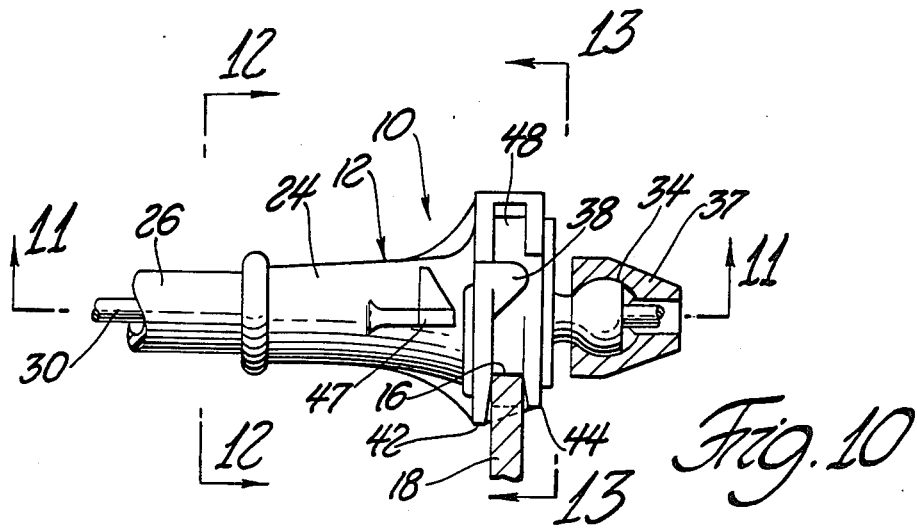
FIG. 10 is a fragmentary side view partially in cross-section of a third embodiment of the instant invention.
Figure 11:
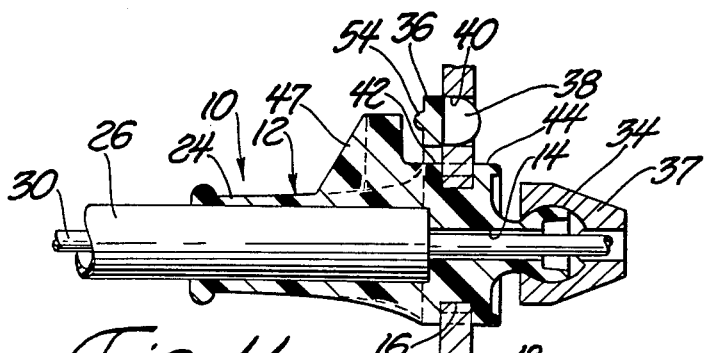
FIG. 11 is a cross-sectional view taken substantially along lines 11—11 of FIG. 10.
Figure 12:
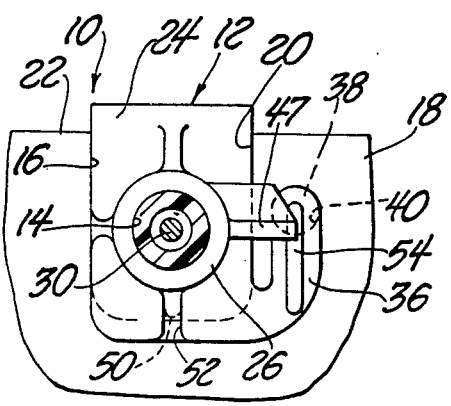
FIG. 12 is a cross-sectional view taken substantially along lines 12—12 of FIG. 10.
Figure 13:
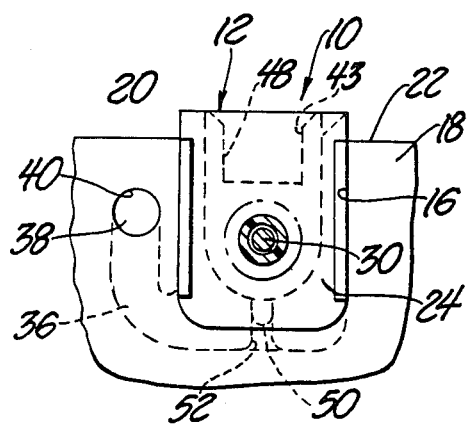
FIG. 13 is a cross-sectional view taken substantially along lines 13—13 of FIG. 10.
Figure 14:
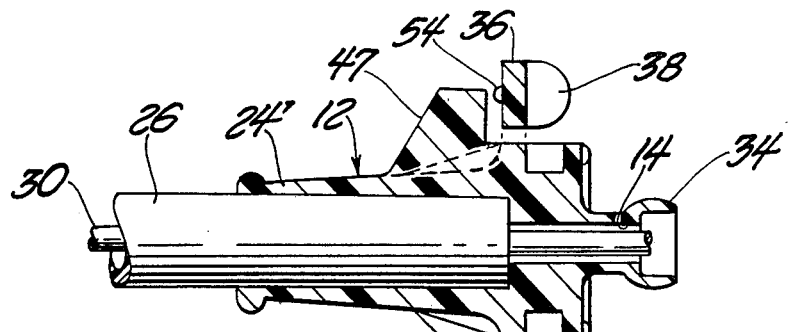
FIG. 14 is a cross-sectional view of the second support fitting.
Figure 15:
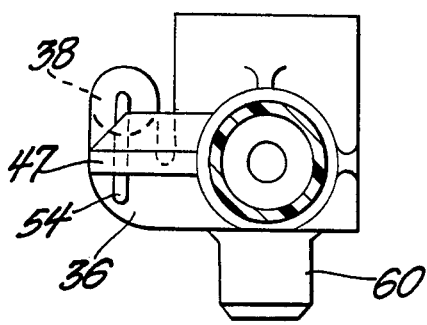
FIG. 15 is a cross-sectional rear view of the second support fitting.

The abutment means includes pair of spaced flanges 42, 44 extending from the support fitting 24 for abutting engagement of the support structure 18 therebetween to prevent axial movement of the support fitting 24 relative to the support structure 18. The periphery of the flanges 42, 44 is substantially U-shaped. The flanges 42, 44 define a substantially U-shaped channel therebetween, the arm 36 extends from the support fitting 24 and is spaced axially along the first axis from the channel as shown in FIGS. 7, 11 and 14. The abutment means further includes a substantially U-shaped middle portion 48 that is disposed between the flanges 42, 44 for engaging the U-shaped seat 16.

The middle portion 48 includes a tab 50 which extends outwardly therefrom for insertion into a recess 52 in the support structure 18 to prevent radial movement of the support fitting 24 relative to the support structure 16.

Figure 17:
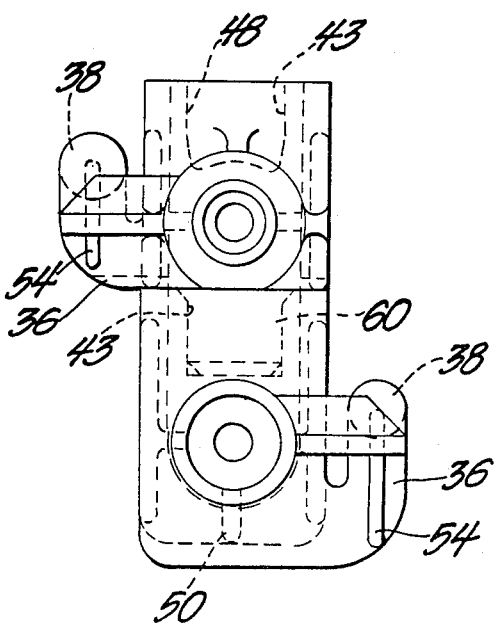
FIG. 17 is a cross-sectional front view of the combined support fitting and second support fitting.
Figure 16:
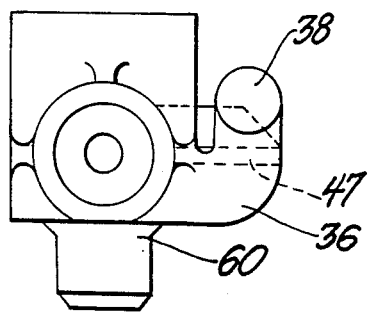
FIG. 16 is a cross-sectional front view of the second support fitting.

The assembly 10 may also include a second support fitting 24' as best shown in FIGS. 14 through 17. The support fittings 24, 24' define a cavity 43 in the top portions thereof. The middle portion 48 of the second support fitting 24' includes an extending portion 60 for disposition within a cavity 43 defined by the support fittings 24, 24'. The extending portion 60 prevents rotary movement of the second support fitting 24' relative to the support structure 18. The extending portion 60 of the second support fitting 24' is disposed within the cavity 43 of the fitting 24 is best shown in FIG. 17. In this manner, the second support fitting 24' is stacked on the first support fitting 24. A plurality of second support fittings 24' may be combined with a support fitting 24 in this manner. When the combination is made, the assembly 10 may carry two or more core elements.

The support fittings 24, 24' further include stop means for limiting deflection of the arm 36 to thereby limit axial deflection of the gripping means to a position no further than the channel. The stop means includes a stop member 47 extending radially outwardly from the support fitting 24, 24' in spaced relationship to the arm 36. The arm 36 includes a reinforcing rib 54 for resisting axial deflection of the arm 36 and for engaging the stop 47 on the support fitting 24, 24'.

The support fitting 24 is mounted on the substantially U-shaped seat 16 by sliding the flanges 42, 44 over the support structure 18. The flanges 42, 44 prevent axial movement of the guide means 12 while the finger like projection 38 prevents lateral movement and the tab 50 prevents rotary movement of the support fitting 24 thereby preventing the support fitting 24 from sliding out of the opening 20 of the substantially U-shaped seat 16. The second support fitting 24' may then be added to the assembly by sliding the flanges over the support structure 18, and inserting the extending portion 60 in the cavity 43 of the support fitting 24.

Figure 3:
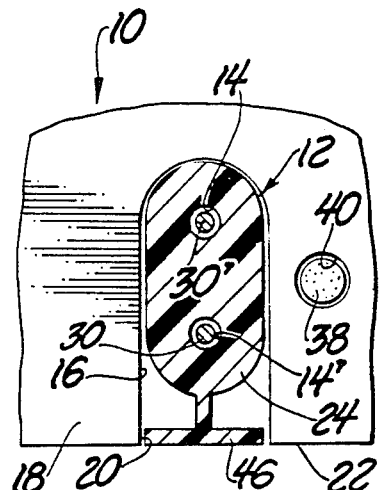
FIG. 3 is cross-sectional view taken substantially along lines 3—3 of FIG. 1.
Figure 4:
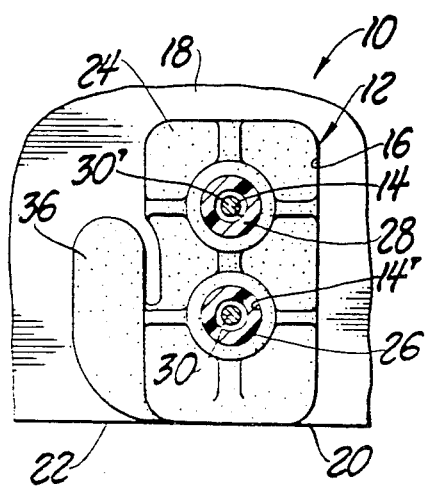
FIG. 4 is a cross-sectional view taken substantially along lines 4—4 of FIG. 1.
Figure 5:
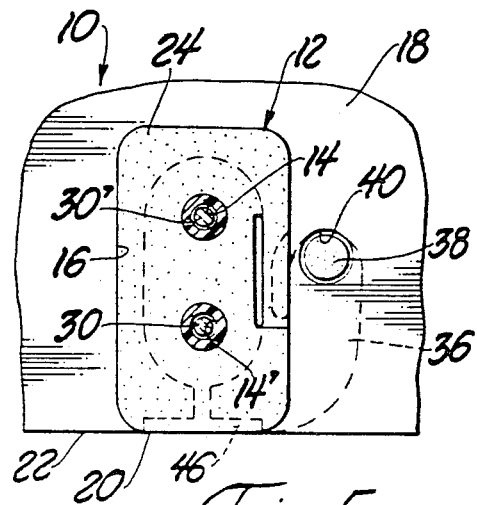
FIG. 5 is a cross-sectional view taken substantially along line 5—5 of FIG. 1.
Figure 6:
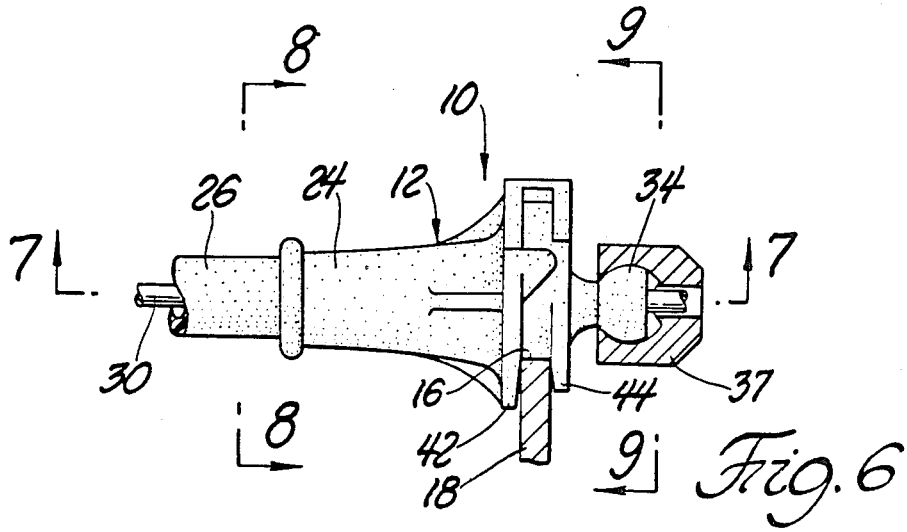
FIG. 6 is a fragmentary side view partially in cross-section of a second embodiment of the instant invention.

The assembly 10 may include cover means for covering the opening 20 of the seat 16 substantially flush with the top surface 22 of the support structure 18. The cover means includes a substantially T-shaped projection 46 as shown in FIGS. 3 and 5. The projection 46 extends radially from the support fitting 24.

The invention has been described in an illustrative manner, and it is to be understood that the terminology which has been used is intended to be in the nature words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise then as specifically described.

What is claimed is:

1. A motion transmitting remote control assembly (10) of the type for transmitting forces along a curved path by a motion transmitting core element (30) and being supported in a U-shaped seat in a bulkhead, said assembly (10) comprising: guide means (12) having first and second ends and an opening (14, 14') therethrough defining a first axis for extending through a substantially U-shaped seat (16) in a support structure (18); a core element (30) movably supported by said guide means (12) for transmitting motion between said ends of said guide means (12); abutment means for positioning said guide means (12) in the substantial U-shaped seat (16) on the support structure (18), an arm (36) extending laterally from said guide means (12) and said abutment means, gripping means (38) disposed on said arm (36) for gripping engagement with the support structure (18) and preventing said guide means (12) from moving laterally out of the U-shaped seat (16), said arm being flexible, said gripping means (38) having a neutral condition and a deflected condition, said arm (36) biasing said gripping means (38) towards said neutral condition from said deflected condition, said arm (36) having top and bottom surfaces defining an L-shape and disposed in spaced planes parallel to said abutment means (42, 44) and transverse to said core element (30) so as to extend laterally and then along and spaced from said guide means (12) to a distal end spaced laterally relative to said guide means (12), said gripping means (38) being disposed on said distal end.

2. An assembly as set forth in claim 1 further characterized by said abutment means including a pair of spaced flanges (42, 44) for abutting engagement of the support structure (18) therebetween to prevent axial movement of said guide means (12) relative to the support structure (18).

3. An assembly as set forth in claim 2 further characterized by including a stop means (47) for limiting deflection of said arm (36) to said deflected position.

4. An assembly as set forth in claim 3 further characterized by said flanges (42, 44) defining a substantially U-shaped channel therebetween, said arm (36) being axially offset along said first axis from said channel.

5. An assembly as set forth in claim 3 further characterized by said stop means (47) being positioned to limit axial deflection of said gripping means (38) to a position no further than the edge of said channel.

6. An assembly as set forth in claim 5 further characterized by said stop means including a stop member (47) extending radially outwardly from said guide means (12) in spaced relationship to said arm (36).

7. An assembly as set forth in claim 6 further characterized by said abutment means including a middle portion (48) disposed between said flanges (42, 440 for engaging said U-shaped seat (16).

8. An assembly as set forth in claim 7 further characterized by said gripping means including a finger (38) projecting from said arm (36) along a second axis which is substantially parallel and spaced from said first axis.

9. An assembly as set forth in claim 8 further characterized by said guide means 12 including a support fitting (24), said support fitting (24) defining a cavity (43).

10. An assembly as set forth in claim 9 further characterized by said middle portion (48) including a tab (50) extending outwardly therefrom for insertion into a recess (52) in the support structure to prevent rotary movement of said support fitting (24) relative to said support structure (18).

11. An assembly as set forth in claim 10 further characterized by the periphery of said flanges (42, 44) being substantially U-shaped.

12. An assembly as set forth in claim 9 further characterized by including a second support fitting (24) including a middle portion (48) having an extended portion (60) for disposition within said cavity (43) of said support fitting (24) to prevent rotary movement of said second support fitting (24') relative to said support structure (18).

13. An assembly as set forth in claim 12 further characterized by said extending portion (60) of said second support fitting (24') being disposed within said cavity (43) of said support fitting (24) to combine said support fitting (24) and said second support fitting (24').

14. An assembly as set forth in claim 13 further characterized by said second support fitting (24') including said abutment means and said gripping means and an opening extending therethrough on said first axis.

15. An assembly as set forth in claim 14 further characterized by said arm (36) including a reinforcing rib (54) for resisting deflection and for engaging said stop (47) on said guide means (12).

16. An assembly as set forth in claim 15 further characterized by said middle portion (48) being substantially U-shaped.

17. An assembly as set forth in claim 16 further characterized by said guide means (12) further including a conduit (26) having one end mounted within said opening of said support fitting (24, 24').

* * * * *